US011636744B2

(12) United States Patent
Huang et al.

(10) Patent No.: US 11,636,744 B2
(45) Date of Patent: Apr. 25, 2023

(54) RETAIL INVENTORY SHRINKAGE REDUCTION VIA ACTION RECOGNITION

(71) Applicant: Shenzhen Malong Technologies Co., Ltd., Shenzhen (CN)

(72) Inventors: Weilin Huang, Shenzhen (CN); Shiwen Zhang, Shenzhen (CN); Limin Wang, Shenzhen (CN); Sheng Guo, Shenzhen (CN); Matthew Robert Scott, Shenzhen (CN)

(73) Assignee: Shenzhen Malong Technologies Co., Ltd., Shenzhen (CN)

( * ) Notice: Subject to any disclaimer, the term of this patent is extended or adjusted under 35 U.S.C. 154(b) by 164 days.

(21) Appl. No.: 17/169,191

(22) Filed: Feb. 5, 2021

(65) Prior Publication Data

US 2021/0248885 A1 Aug. 12, 2021

Related U.S. Application Data

(60) Provisional application No. 62/971,189, filed on Feb. 6, 2020.

(51) Int. Cl.

| *G06V 20/52* | (2022.01) |
| *G08B 13/196* | (2006.01) |
| *G06V 20/40* | (2022.01) |
| *G06V 40/20* | (2022.01) |
| *G06Q 10/087* | (2023.01) |
| *G06Q 50/26* | (2012.01) |

(52) U.S. Cl.
CPC ....... *G08B 13/19613* (2013.01); *G06V 20/41* (2022.01); *G06V 20/46* (2022.01); *G06V 20/52* (2022.01); *G06V 40/20* (2022.01); *G06Q 10/087* (2013.01); *G06Q 50/26* (2013.01); *G06V 20/44* (2022.01)

(58) Field of Classification Search
CPC .. G08B 13/19613; G06V 20/52; G06V 20/46; G06V 20/41; G06V 40/20; G06V 20/44; G06Q 10/087; G06Q 50/26
See application file for complete search history.

(56) References Cited

U.S. PATENT DOCUMENTS

| 2013/0336531 | A1* | 12/2013 | Bobbitt | G06V 40/20 |
| | | | | 382/103 |
| 2019/0174412 | A1* | 6/2019 | Mahajan | H04W 68/02 |
| 2019/0180149 | A1* | 6/2019 | Knittel | G06N 3/04 |
| 2019/0205643 | A1* | 7/2019 | Liu | G06N 3/04 |
| 2020/0057891 | A1* | 2/2020 | Hayata | G06V 10/10 |

\* cited by examiner

*Primary Examiner* — Syed Haider
(74) *Attorney, Agent, or Firm* — Shook, Hardy & Bacon L.L.P.

(57) ABSTRACT

This disclosure includes technologies for action recognition in general. The disclosed system may automatically detect various types of actions in a video, including reportable actions that cause shrinkage in a practical application for loss prevention in the retail industry. Further, appropriate responses may be invoked if a reportable action is recognized. In some embodiments, a three-branch architecture may be used in a machine learning model for action and/or activity recognition. The three-branch architecture may include a main branch for action recognition, an auxiliary branch for learning/identifying an actor (e.g., human parsing) related to an action, and an auxiliary branch for learning/identifying a scene related to an action. In this three-branch architecture, the knowledge of the actor and the scene may be integrated in two different levels for action and/or activity recognition.

20 Claims, 8 Drawing Sheets

RETAIL INVENTORY SHRINKAGE REDUCTION VIA ACTION RECOGNITION

This application claims the benefit of U.S. Provisional Application No. 62/971,189, filed on Feb. 6, 2020, which is hereby incorporated by reference in its entirety.

BACKGROUND

"Retail shrinkage" or "shrinkage" means there are fewer items in stock than shown on an inventory list (e.g., due to shoplifting, theft and/or bookkeeping errors). Shrinkage reduces profits for retailers, which may lead to increased prices for consumers to make up for the reduced profits.

Shoplifting has traditionally been attributed as a top cause of retail shrinkage. To collect evidence for shoplifting, surveillance cameras are ubiquitously installed in retail stores. However, to prevent shoplifting in real time, significant human resources are often required to monitor the video footage from the surveillance cameras, which is often unpractical for smaller retailers, such as convenience stores. Further, even skilled security personnel cannot focus on different monitors simultaneously or uninterrupted for long periods of time due to limited perceptual span and attention span.

A technical solution is needed for automated action recognition in various industries for various tasks, including surveillance related tasks, such as recognizing shoplifting or other actions in a video. In this way, retailers can focus on customer services instead of shrinkage.

SUMMARY

This Summary is provided to introduce selected concepts that are further described below in the Detailed Description. This Summary is not intended to identify key features or essential features of the claimed subject matter, nor is it intended to be used as an aid in determining the scope of the claimed subject matter.

In general, aspects of this disclosure include a technical application for digital video analysis or enhancement, including detecting various types of actions in a video. Accordingly, the disclosed system may incorporate external semantic cues into action recognition via knowledge distillation. In some embodiments, a three-branch architecture may be used in a machine learning model for action and/or activity recognition. The three-branch architecture may include a main branch for action recognition, an auxiliary branch for learning/identifying an actor (e.g., human parsing) related to an action, and an auxiliary branch for learning/identifying a scene related to an action. In this three-branch architecture, the knowledge of the actor and the scene may be integrated in two different levels for action and/or activity recognition. First, a cross branch integration (CBI) module may be used for integrating intermediate features from the three auxiliary branches. Second, an action knowledge graph (AKG) may be used for integrating high-level features from the three auxiliary branches. Accordingly, embodiments of the disclosed technical application can classify actions and/or activities based on auxiliary information, such as the knowledge of the actor related to the actions and the scene related to the actions. Further, the disclosed technical application is configured to launch appropriate responses based on a recognized action and/or activity (e.g., shoplifting) in a video.

In various embodiments, systems, methods, and computer-readable storage devices are provided to improve a computing system's ability for action and/or activity recognition in general. Specifically, the technologies described herein improve a computing system's ability for video (e.g., RGB-based video) action and/or activity recognition, including recognizing and reporting a type of reportable action of an actor in a video and/or video data. For example, the system described herein may determine that a customer in a retail environment has performed one or more actions relating to a shoplifting activity. Based on this determination, the system may provide a message to security personnel regarding the shoplifting activity. The message may include video and/or segments of video corresponding to the shoplifting activity. Additionally, the message may include image data of the customer determined to have performed the shoplifting activity. Some embodiments of the technologies described herein are directed to improvements to a computing system's ability to utilize semantic information (e.g., information of actor and context) for action recognition. Further embodiments of the technologies described herein are directed to improvements to a computing system's ability to perform various functions or other practical applications in response to the recognized action in the video, as discussed in the DETAILED DESCRIPTION.

BRIEF DESCRIPTION OF THE DRAWINGS

The technologies described herein are illustrated by way of example and not limited in the accompanying figures in which like reference numerals indicate similar elements and in which.

DETAILED DESCRIPTION

Figure 1:
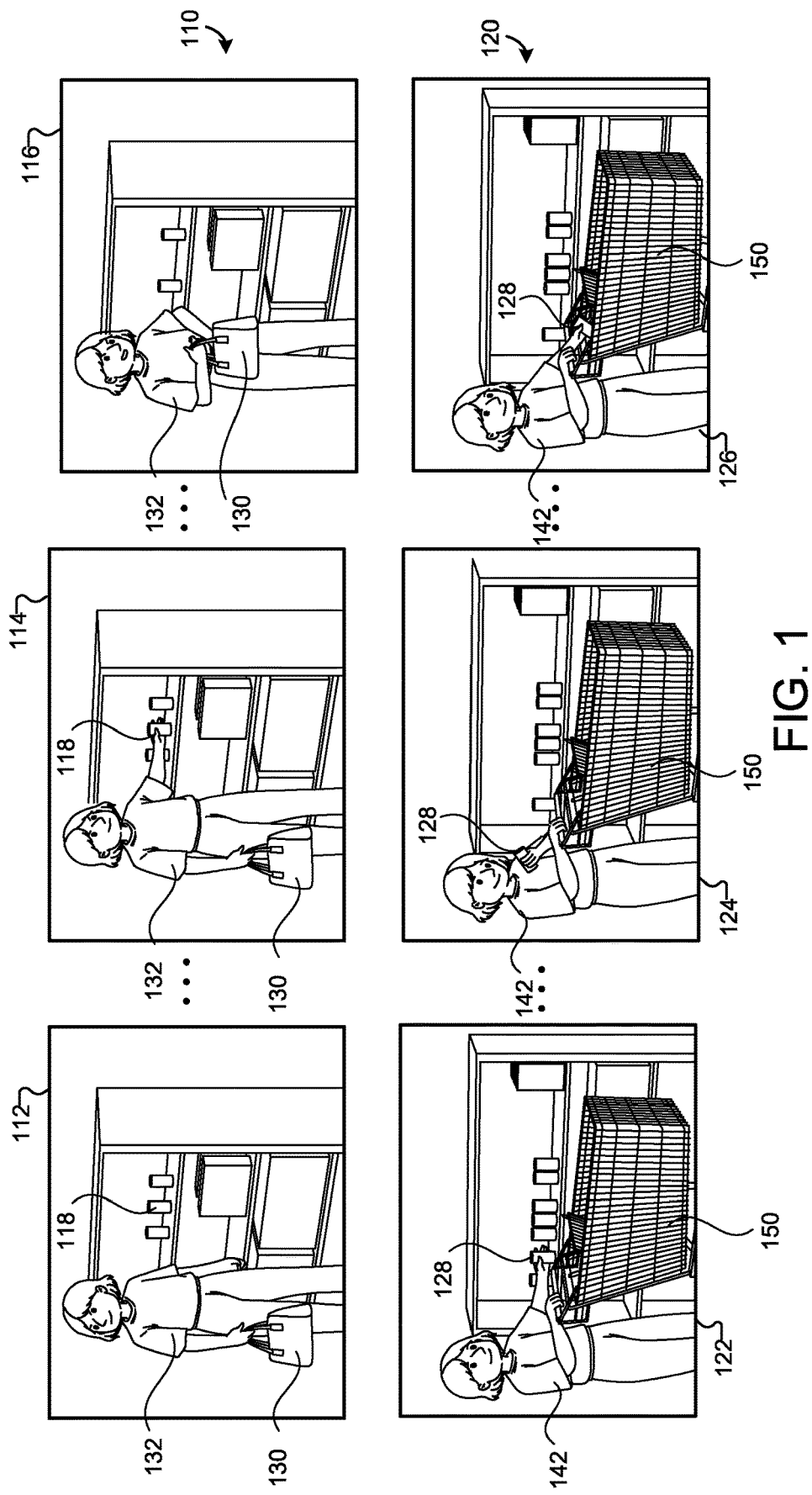
FIG. 1 is a schematic representation illustrating exemplary actions in a video, suitable for use in implementing some embodiments of the present disclosure.

The various technologies described herein are set forth with sufficient specificity to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described. Further, the term "based on" generally denotes that the succedent condition is used in performing the precedent action.

The profit margin of a particular industry is often limited. An effective strategy for the retail industry to increase or maintain profit margins is to reduce labor costs and preventable losses. However, the two sides of this strategy may be at odds with each other because conventional solutions for loss-prevention often demand additional labor costs.

Self-checkout machines and cashier-less retail stores have become increasingly popular for various kinds of retailers to reduce labor costs. Self-checkout, also known as self-service checkout, is an alternative to traditional cashier-staffed checkout. In self-checkout systems, self-checkout machines are provided for customers to process their own purchases from a retailer. On the other hand, a cashier-less system in a retail store may be automated to enable customers to purchase products without being checked out by a cashier and/or without using a self-checkout machine. However, both self-checkout systems and cashier-less systems are generally more vulnerable to shrinkage than traditional cashier-staffed checkout systems due to less human oversight.

Shrinkage, as used herein, is preventable inventory loss for retailers usually caused by deliberate or inadvertent human actions. The majority of shrinkage in a retail environment is caused by deliberate human actions (e.g., fraud, theft, vandalism). Some shrinkage is caused by inadvertent human actions, such as poorly executed business processes, and may be mitigated by enacting or improving employee training and customer education. However, direct interventions with customers are often required to stop deliberate human actions leading to shrinkage, such as abuse, fraud, theft, vandalism, waste, or other misconduct (i.e., shrinkage events). Studies suggest that a great proportion of customers in self-checkout and/or cashier-less retail environments are tempted to commit the aforementioned deliberate human actions due to the relative ease of doing so.

Retail loss prevention is geared towards the elimination of shrinkage. Traditional approaches to retail loss prevention are typically implemented via electronic article surveillance (EAS) systems and/or human surveillance (e.g., via closed circuit television (CCTV)). EAS is a technological method for preventing unauthorized removal of products from retail stores by fixing special tags (e.g., magnetic tags) to products. However, such tags may be deliberately removed by customers to defeat the EAS technology. As a supplemental security measure, human surveillance may be adopted to deter deliberate human actions. Human surveillance includes observations within an observer's direct view, or from a distance by means of electronic equipment, such as CCTV. However, staffing loss prevention personnel, including uniformed and/or plain-clothed security for human surveillance, often results in significant labor costs. Further, a human's attention span is limited. Attention span is the amount of concentrated time a person can spend on a task without becoming distracted. Even a skilled loss prevention agent cannot focus on different customers and/or monitors simultaneously or maintain uninterrupted focus for long due to their limited perceptual span and attention span. Meanwhile, the fear of making mistakes (e.g., false positive) can be stressful for loss prevention personnel because false accusations against an innocent business patron may cause dire consequences, including customer dissatisfaction, tarnished business reputation, civil lawsuits, and even criminal prosecution. Resultantly, traditional approaches to retail loss prevention are not only costly but may be ineffective.

To overcome the limitations of traditional systems, such as those described above, the disclosed system is adapted to automatically identify various types of actions and/or activities in a video (e.g., deliberate human actions that cause shrinkage). At a high level, the disclosed system incorporates external semantic cues to identify actions and/or activities via knowledge distillation (e.g., transferring knowledge from one or more large models to one or more smaller models without loss of validity). In some embodiments, a three-branch architecture (e.g., Knowledge Integration Networks (referred as KINet)) may be used in a machine learning model to process video data for action and/or activity recognition. The three-branch architecture may include a main branch for action recognition, an auxiliary branch for learning an actor (e.g., human parsing) related to an action, and an auxiliary branch for learning a scene or context related to an action. In some embodiments, each branch of the three branch architecture may identify intermediate features in video data. The identified intermediate features may correspond to the associated branch. For example, a human parsing branch may identify intermediate features corresponding to a human depicted in the video data. In this three-branch architecture, the knowledge of the actor and the scene or context may be integrated in a two level knowledge encoding system for action and/or activity recognition/identification. First, the knowledge encoding system may include a cross branch integration (CBI) module that may be used for integrating/fusing intermediate features from the three auxiliary branches to generate a set of high-level features. In general, high-level features—such as high-level action features—may be a representation of semantic information extracted from the video data. Second, the knowledge encoding system may include an action knowledge graph (AKG) that may be used for integrating/fusing high-level information (e.g., context information, convolutional features) from the three auxiliary branches. For example, a KINet may be capable of aggregating meaningful context features (e.g., actor information and scene context) to aid in identifying an action and/or activity in a video. Moreover, the system may employ two pre-trained models as teacher networks to distill knowledge of a human and a scene for training the auxiliary tasks of the KINet. Accordingly, the system of the present disclosure may be an end-to-end trainable framework where the three tasks (e.g., human parsing, action recognition, and scene recognition) can be trained collaboratively, allowing the model to compute strong context knowledge efficiently. Moreover, embodiments of the disclosed technical application can classify actions and or activities in a video based on auxiliary information, such as the knowledge of the actor related to the actions and the scene related to the actions. Advantageously, the disclosed system is able to perform action recognition tasks more accurately based on contextual knowledge of the actor and the scene related to the action. Generally, the KINet may possess a more clear understanding of human and scene concepts, compared with a baseline temporal segment network. Integration of multiple domain specific knowledge may enable the KINet to recognize complex actions and/or activities involving various high-level semantic cues.

In some embodiments, the disclosed technologies may be used in various practical applications to identify actions and/or activities in a video, such as shrinkage-related actions and/or activities conducted by a shoplifter near a point-of-sale (POS), irregular or defect operations made by a robot and/or a person near/on an assembly line, and/or other types of reportable actions defined in respective practical applications. Further, the disclosed technical application is configured to launch appropriate responses based on identified actions and/or activities in a video relating to theft, mishandling of inventory, and/or other actions associated with shrinkage. For example, when the system identifies an action and/or activity associated with shrinkage, the disclosed system may generate and send a warning message, including one or more images, video segments relevant to the action and/or activity, a timestamp corresponding to the action and/or activity, location data (e.g., location within a store, GPS location, etc.), image data corresponding to inventory that may have been stolen (e.g., stock image and/or actual image), and other relevant data to a designated device to warn a human operator. Accordingly, the human operator may take appropriate loss-prevention actions. In some embodiments, a report comprising information included in the warning message may be automatically generated based on determining a reportable action has been identified. Additionally or alternatively, the warning message may be provided to the subject (e.g., a shopper or a cashier) of the action and/or activity, so that the subject may self-correct the issue.

Experiments were conducted on various action recognition benchmarks, where the disclosed system achieved outstanding results. For example, disclosed system achieves the state-of-the-art performance on a large-scale action recognition benchmark Kinetics-400, with a top-1 accuracy of 77.8%. The disclosed system was demonstrated as having strong capability by transferring the Kinetics-trained model to the UCF-101 action recognition data set, where it obtains 97.8% top-1 accuracy.

Some conventional solutions considered action recognition as a classification problem, and attempted to learn action-related semantic cues directly from training videos. These conventional solutions assumed that action-related features can be implicitly learned with powerful CNN models by simply using video-level action labels. However, embodiments of the present disclosure have proven that learning both action and actor segmentation jointly can boost the performance of both tasks. Experiments were conducted on a large-scale testbed for various vision problems (e.g., A2D dataset), where the ground truth of actor masks and per-pixel action labels were provided. However, in practice, it is highly expensive to provide pixel-wise action labels for a large-scale video dataset, and such per-pixel annotations are not available in most action recognition benchmarks, such as Kinetics and UCF-101. An action can be defined by multiple elements, features or context information. Some conventional systems attempted to combine object, scene and action recognition by using a multiple instance learning framework. Other conventional systems attempted to introduce object features to action recognition by discovering the relations of action and objects. However, each of these conventional methods commonly rely on external networks to extract semantic cues, while such external networks were trained independently, and were fixed when applied to action recognition. This inevitably limits the capability of conventional systems for learning meaningful action recognition/identification. In comparison, the disclosed system has the capability to learn the additional knowledge of a human and a scene via knowledge distillation, allowing one to learn action recognition jointly with human parsing and scene recognition with a single model, providing a more efficient manner to encode context knowledge for action recognition.

In some embodiments, deep learning methods may be used for various vision tasks, such as human parsing, pose estimation, semantic segmentation, and scene recognition. The disclosed system may utilize these existing technologies to enhance one or more model capabilities by learning context knowledge from action videos. In some embodiments, a knowledge distillation system may learn the context knowledge of a human and a scene explicitly, by training action recognition jointly with human parsing and scene recognition. Jointly training action recognition with human parsing and scene recognition may allow these three tasks to work collaboratively, providing a more principled approach that may learn rich context information for action recognition without additional manual annotations.

Having briefly described an overview of aspects of the technologies described herein, a schematic representation illustrating exemplary actions in a video are described in connection with FIG. 1. As shown in FIG. 1, FIG. 1 illustrates sequence 110 which includes a sequence of frames reflecting a reportable action (e.g., an action and/or activity in which a message may be generated to alert security personnel) for concealing a product 118. From left to right, frame 112 illustrates that a subject 132 enters an observation scope, which covers a particular shelf with various products, including product 118. The subject 132 may be identified by the system in video data. Next, frame 114 illustrates that the subject 132 picks up the product 118. Next, frame 116 illustrates that the subject 132 conceals the product 118 in a handbag 130. The disclosed system here is adapted to recognize this reportable action based on video-level temporal evolution of spatio-temporal features in sequence 110, such as the whereabouts of the product 118 and its spatio-temporal relationship with the subject 132 and other objects (e.g., handbag 130) detected in the video. In some embodiments, video-level 4D convolutional neural networks may be used to model the evolution of long-range spatio-temporal representations with 4D convolutions. Modeling the evolution of long-range spatio-temporal representations with 4D convolutions is described in more detail in Applicant's U.S. Pat. No. 10,713,493 titled "4D Convolutional Neural Networks For Video Recognition," the contents of which are herein incorporated by reference in their entirety.

In contrast to sequence 110, sequence 120 includes another sequence of frames reflecting a regular (e.g., non-reportable) shopping action. From left to right, frame 122 illustrates that the subject 142 picks up a product 128. Next, frame 124 illustrates that the subject 142 studies the product 128. Next, frame 126 illustrates that the subject 142 places the product 128 into a shopping cart 150. Similarly, the disclosed system here can recognize this non-reportable action based on video-level temporal evolution of spatio-temporal features in sequence 120.

An action and/or activity in a video may be determined based on many consecutive frames of the video. Depending on the type of action and/or activity to be observed, the action and/or activity may include a few specific key elements and/or observations. By way of example, one type of action and/or activity related to shrinkage is shoplifting. To identify a typical shoplifting action and/or activity, one key observation may be that a subject (e.g., customer, employee, etc.) attempts to conceal a product, and another key observation may be that the subject attempts to take the concealed product out of a store without payment. For the concealment, it is also advantageous to recognize the actual product and where it was concealed. In some embodiments, action and/or activity recognition is configured to be product-oriented action recognition, instead of traditional person-oriented action and/or activity recognition.

However, shoplifting has many different species. For example, some subjects may carry a product out without even concealing the product. In this case, it is important to maintain an unbroken observation of the subject in relation to the observation scope, which could be an entire store (e.g., inside and outside the store) or a specific area in the store, (e.g., a department, an aisle, a camera zone, etc.) Here, one key observation is about the subject entering the observation scope, and another key observation is about the subject leaving the observation scope. For example, by comparing a large red handbag carried out by a customer at an exit to the store with the small yellow handbag carried in by the customer at an entrance to the store, an opinion may be formed regarding whether there is a reportable action related to the handbag.

In various embodiments, different levels of observation scopes may be configured for different purposes. Using shoplifting as an example, one level may be established at the store level, in which the disclosed system may track whereabouts of a subject, and particularly to make observations of the subject at an entrance, at a checkout area, and at an exit. Another level may be established at the aisle or shelf level, in which the system may observe how the subject selects merchandise, and particularly to make observations of what products have been selected and whereabouts of those selected products. Another level may be established at the POS level, in which the system may observe how the subject checks out (e.g., purchases and/or does not purchase) the products, and particularly to make observations of any irregular checkout actions, such as any missed scans. Other observation scopes may be configured for other purposes.

Figure 2:
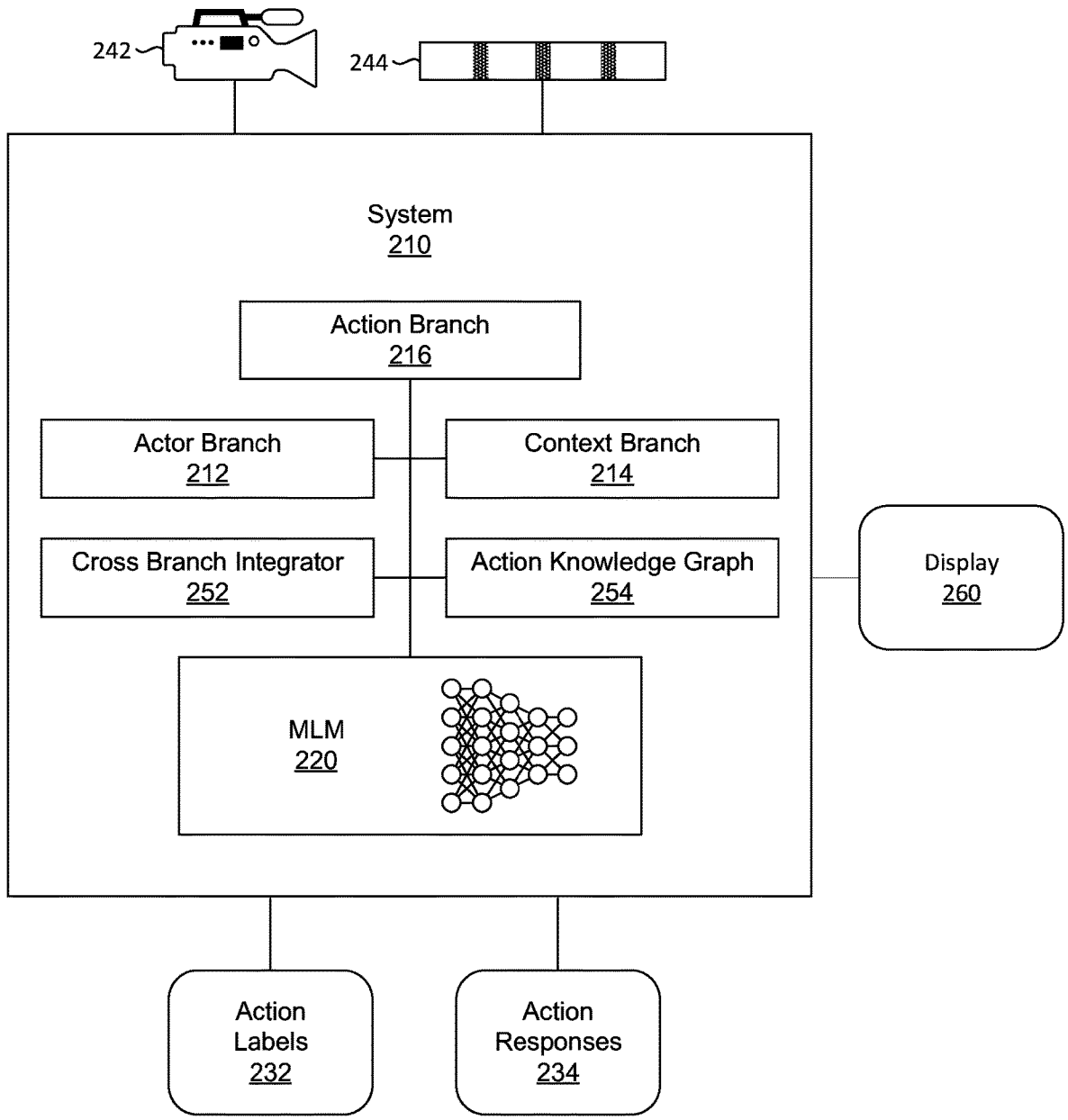
FIG. 2 is a block diagram of an exemplary action recognition system, suitable for use in implementing some embodiments of the present disclosure.

Referring to FIG. 2, FIG. 2 shows an exemplary action recognition system 210, suitable for use in implementing some embodiments of the present disclosure. The action recognition system 210 is merely one example of a suitable computing environment and is not intended to suggest any limitation as to the scope of use or functionality of aspects of the technologies described herein. Neither should this action recognition system be interpreted as having any dependency or requirement relating to any one component nor any combination of components illustrated.

Action recognition system 210 may retrieve video 244 from a storage media and/or receive a video from video camera 242 directly. Further, action recognition system 210 can recognize various actions in the video 244 and classify respective actions based on action labels 232, which are determined based on the specific application. In some embodiments, action labels 232 may include binary labels at the top level, (e.g., reportable vs. non-reportable, irregular vs. regular, above a threshold vs. not above the threshold, etc.). In some embodiments, action labels 232 may include further labels at additional levels. For example, in a shrinkage detection application, additional labels for the reportable actions may include different types of reportable actions, such as abuse, fraud, theft, vandalism, waste, or other misconduct. For fraud, different types of fraud actions (e.g., ticket switch) may be added to action labels 232. Similarly, for theft, different types of theft actions (e.g., concealment, open carry, etc.) may be added to action labels 232.

Based on the one or more action labels 232 assigned to a detected action in the video 244, the action recognition system 210 can invoke various action responses 234. In some embodiments, in response to recognizing an action in the video 244 that is associated with one or more action labels 232 associated with one or more reportable actions, the system may generate a message (e.g., a warning message). The message may include information of the reportable action. Information of the reportable actions may include the one or more action labels 232 associated with one or more reportable actions. In some embodiments, in response to recognizing an action in the video 244 that is associated with one or more action labels 232 associated with one or more reportable actions, the system may record a timestamp associated with the reportable action. Based on the timestamp, the information of the one or more reportable actions may include one or more representative images from video 244, such as those images illustrating key observations related to the reportable action, for example, frame 116 in sequence 110 as discussed in connection with FIG. 1. The information of the reportable actions may further include a video clip corresponding to the timestamp of the reportable action, for example, the reportable action in sequence 110 in FIG. 1.

The message may be distributed to one or more designated devices, for example, a monitoring device accessible to a loss prevention staff, a mobile device accessible to a store clerk, or a computing device accessible to the subject in the video. By way of example, the message of a reportable action may be displayed to the subject (e.g., via a checkout machine) during the check-out process or distributed to a device or an account of the subject registered in action recognition system 210 in real-time or near real-time. In this way, the subject may self-correct mistakes, (e.g., to check-out the product in the handbag, as illustrated in FIG. 1). Otherwise, the loss prevention staff may intervene at an appropriate time to apply appropriate corrections.

In other embodiments, action responses 234 may include invoking various physical signals. In one embodiment, action recognition system 210 may activate a warning light or prompt a voice message near the subject of the reportable action. For instance, returning to FIG. 1, the disclosed system can activate a warning light on or near the shelf. Alternatively, action responses 234 can activate a warning light on a shopping cart. Similarly, action responses 234 can prompt a voice message prompting the subject of the reportable action. In some embodiments, action responses 234 may invoke other actions to pause or stop the checkout process.

Advantageously, when action recognition system 210 is used in a loss prevention application, it automates various action recognition tasks, so that store personnel can effectively prevent or mitigate shrinkage with reduced loss prevention personnel and/or reduced resources spent in loss prevention. Moreover, shrinkage-related actions can be deterred or at least discouraged.

Additionally, the action recognition system 210 includes actor branch 212, context branch 214, action branch 216, cross branch integrator 252, action knowledge graph 254, and machine learning module (MLM) 220, operatively coupled with each other. As discussed herein, the actor branch 212 may identify features corresponding to an actor (e.g., human) depicted in video data received from video camera 242. The context branch 214 may be configured for identifying features corresponding to a scene and/or context depicted in the video data received from video camera 242. The cross-branch integrator 252 may be used for integrating/fusing intermediate action features with intermediate features from the actor branch 212 and the context branch 214 to generate a set of high-level features. The action knowledge graph 254 may be used for integrating/fusing the set of high-level features from the cross-branch integrator 252 with high-level information (e.g., context information, convolutional features) from the actor branch 212 and the context branch 214. Actor branch 212, context branch 214, action branch 216, cross branch integrator 252, and action knowledge graph 254 are further discussed in connection with other figures.

To perform various functions, (e.g., RGB-based video action recognition), action recognition system 210 may use various machine learning models, (e.g., implemented via MLM 220), which may include one or more neural networks in some embodiments. MLM 220 may use various neural networks. As used herein, a neural network comprises at least three operational layers. The three operational layers can include an input layer, a hidden layer, and an output layer. Each layer comprises neurons. The input layer neurons pass data to neurons in the hidden layer. Neurons in the hidden layer pass data to neurons in the output layer. The output layer then produces a classification. Different types of layers and networks may connect neurons in different ways.

Every neuron has weights, an activation function that defines the output of the neuron given an input (including the weights), and an output. The weights are the adjustable parameters that cause a network to produce a correct output. The weights are adjusted during training. Once trained, the weight associated with a given neuron can remain fixed. The other data passing between neurons can change in response to a given input (e.g., image).

The neural network may include many more than three layers. Neural networks with more than one hidden layer may be called deep neural networks. Example neural networks that may be used with aspects of the technology described herein include, but are not limited to, multilayer perceptron (MLP) networks, convolutional neural networks (CNN), recursive neural networks, recurrent neural networks, and long short-term memory (LSTM) (which is a type of recursive neural network). Some embodiments described herein use a convolutional neural network, but aspects of the technology are applicable to other types of multi-layer machine classification technology.

A CNN may include any number of layers. The objective of one type of layers (e.g., Convolutional, ReLU, and Pool) is to extract features of the input volume, while the objective of another type of layers (e.g., fully connected (FC) and Softmax) is to classify based on the extracted features. An input layer may hold values associated with an instance. For example, when the instance is an image(s), the input layer may hold values representative of the raw pixel values of the image(s) as a volume (e.g., a width, W, a height, H, and color channels, C (e.g., RGB), such as W×H×C), and/or a batch size, B.

One or more layers in the CNN may include convolutional layers. The convolutional layers may compute the output of neurons that are connected to local regions in an input layer (e.g., the input layer), each neuron computing a dot product between their weights and a small region they are connected to in the input volume. In a convolutional process, a filter, a kernel, or a feature detector includes a small matrix used for features detection. Convolved features, activation maps, or feature maps are the output volume formed by sliding the filter over the image and computing the dot product. An exemplary result of a convolutional layer may be another volume, with one of the dimensions based on the number of filters applied (e.g., the width, the height, and the number of filters, F, such as W×H×F, if F were the number of filters).

One or more of the layers may include a rectified linear unit (ReLU) layer. The ReLU layer(s) may apply an elementwise activation function, such as the max (0, x), thresholding at zero, for example, which turns negative values to zeros (thresholding at zero). The resulting volume of a ReLU layer may be the same as the volume of the input of the ReLU layer. This layer does not change the size of the volume, and there are no hyperparameters.

One or more of the layers may include a pool or pooling layer. A pooling layer performs a function to reduce the spatial dimensions of the input and control overfitting. There are different functions, such as Max pooling, average pooling, or L2-norm pooling. In some embodiments, max pooling is used, which only takes the most important part (e.g., the value of the brightest pixel) of the input volume. By way of example, a pooling layer may perform a down-sampling operation along the spatial dimensions (e.g., the height and the width), which may result in a smaller volume than the input of the pooling layer (e.g., 16×16×12 from the 32×32×12 input volume). In some embodiments, the convolutional network may not include any pooling layers. Instead, strided convolutional layers may be used in place of pooling layers.

One or more of the layers may include a fully connected (FC) layer. A FC layer connects every neuron in one layer to every neuron in another layer. The last FC layer normally uses an activation function (e.g., Softmax) for classifying the generated features of the input volume into various classes based on the training dataset. The resulting volume may be 1×1×number of classes.

Further, calculating the length or magnitude of vectors is often required either directly as a regularization method in machine learning, or as part of broader vector or matrix operations. The length of the vector is referred to as the vector norm or the vector's magnitude. The L1 norm is calculated as the sum of the absolute values of the vector. The L2 norm is calculated as the square root of the sum of the squared vector values. The max norm is calculated as the maximum vector values.

As discussed previously, some of the layers may include parameters (e.g., weights and/or biases), such as a convolutional layer, while others may not, such as the ReLU layers and pooling layers, for example. In various embodiments, the parameters may be learned or updated during training. Further, some of the layers may include additional hyper-parameters (e.g., learning rate, stride, epochs, kernel size, number of filters, type of pooling for pooling layers, etc.), such as a convolutional layer or a pooling layer, while other layers may not, such as a ReLU layer. Various activation functions may be used, including but not limited to, ReLU, leaky ReLU, sigmoid, hyperbolic tangent (tan h), exponential linear unit (ELU), etc. The parameters, hyper-parameters, and/or activation functions are not to be limited and may differ depending on the embodiment.

Although input layers, convolutional layers, pooling layers, ReLU layers, and fully connected layers are discussed herein, this is not intended to be limiting. For example, additional or alternative layers, such as normalization layers, Softmax layers, and/or other layer types, may be used in a CNN.

Different orders and layers in a CNN may be used depending on the embodiment. For example, when action recognition system 210 is used in practical applications for loss prevention (e.g., with emphasis on product-oriented action recognition), there may be one order and one combination of layers; whereas when action recognition system 210 is used in practical applications for crime prevention in public areas (e.g., with emphasis on person-oriented action recognition), there may be another order and another combination of layers. In other words, the layers and their order in a CNN may vary without departing from the scope of this disclosure.

Although many examples are described herein with respect to using neural networks, and specifically convolutional neural networks, this is not intended to be limiting. For example, and without limitation, MLM 220 may include any type of machine learning models, such as a machine learning model(s) using linear regression, logistic regression, decision trees, support vector machines (SVM), Naïve Bayes, k-nearest neighbor (KNN), K means clustering, random forest, dimensionality reduction algorithms, gradient boosting algorithms, neural networks (e.g., auto-encoders, convolutional, recurrent, perceptrons, long/short term memory/LSTM, Hopfield, Boltzmann, deep belief, deconvolutional, generative adversarial, liquid state machine, etc.), and/or other types of machine learning models.

The action recognition system 210 is merely one example of a suitable computing environment and is not intended to suggest any limitation as to the scope of use or functionality of aspects of the technologies described herein. Neither should this system be interpreted as having any dependency or requirement relating to any one component nor any combination of components illustrated.

It should be understood that this arrangement of various components in action recognition system 210 is set forth only as an example. Other arrangements and elements (e.g., machines, networks, interfaces, functions, orders, and grouping of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by an entity may be carried out by hardware, firmware, and/or software. For instance, some functions may be carried out by a processor executing instructions stored in memory.

Figure 8:
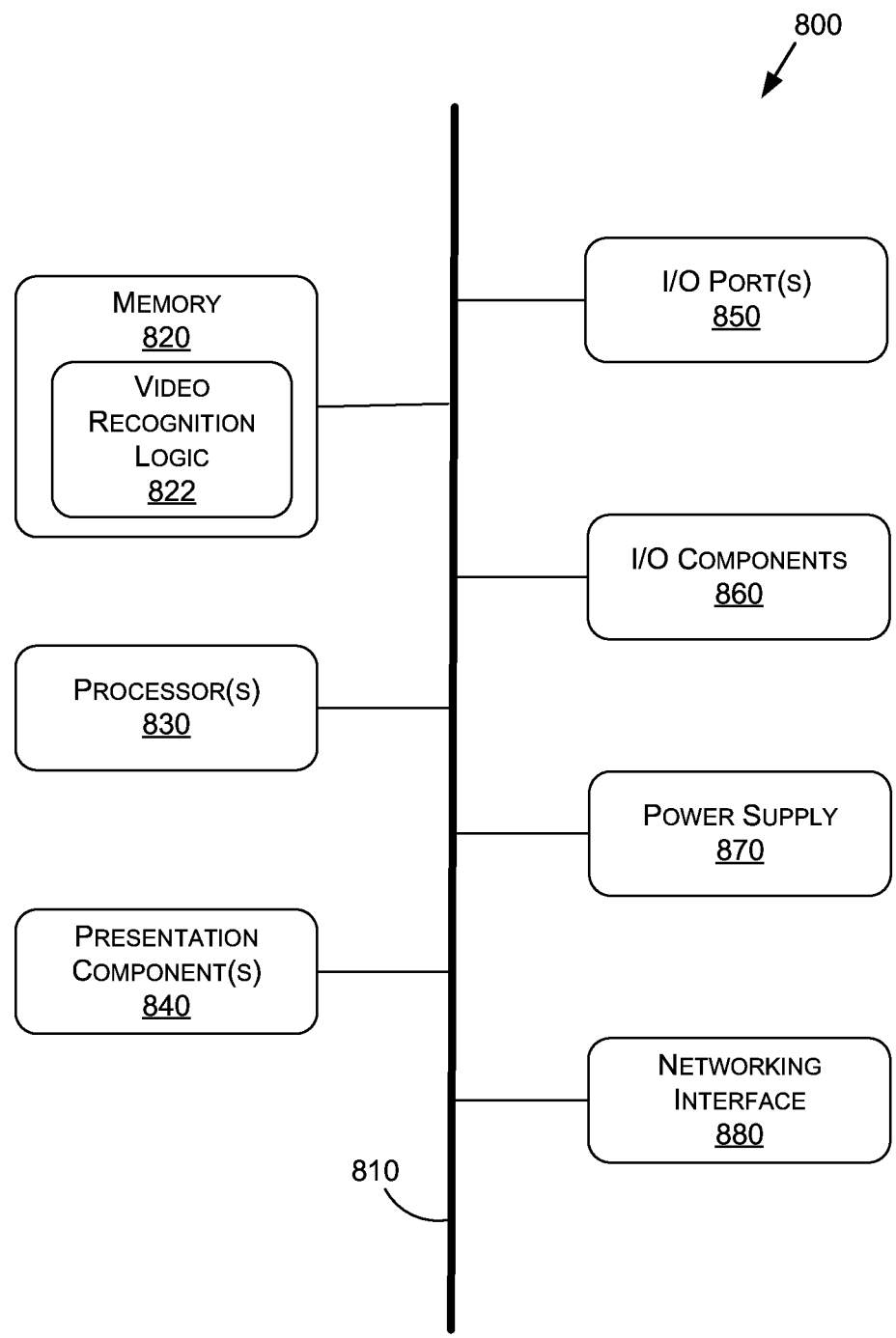
FIG. 8 is a block diagram of an exemplary computing environment suitable for use in implementing some embodiments of the present disclosure.

It should be understood that each of the components shown in action recognition system 210 may be implemented on any type of computing devices, such as computing device 800 described in FIG. 8. Further, each of the components may communicate with various external devices via a network, which may include, without limitation, a local area network (LAN) or a wide area network (WAN).

Figure 3:
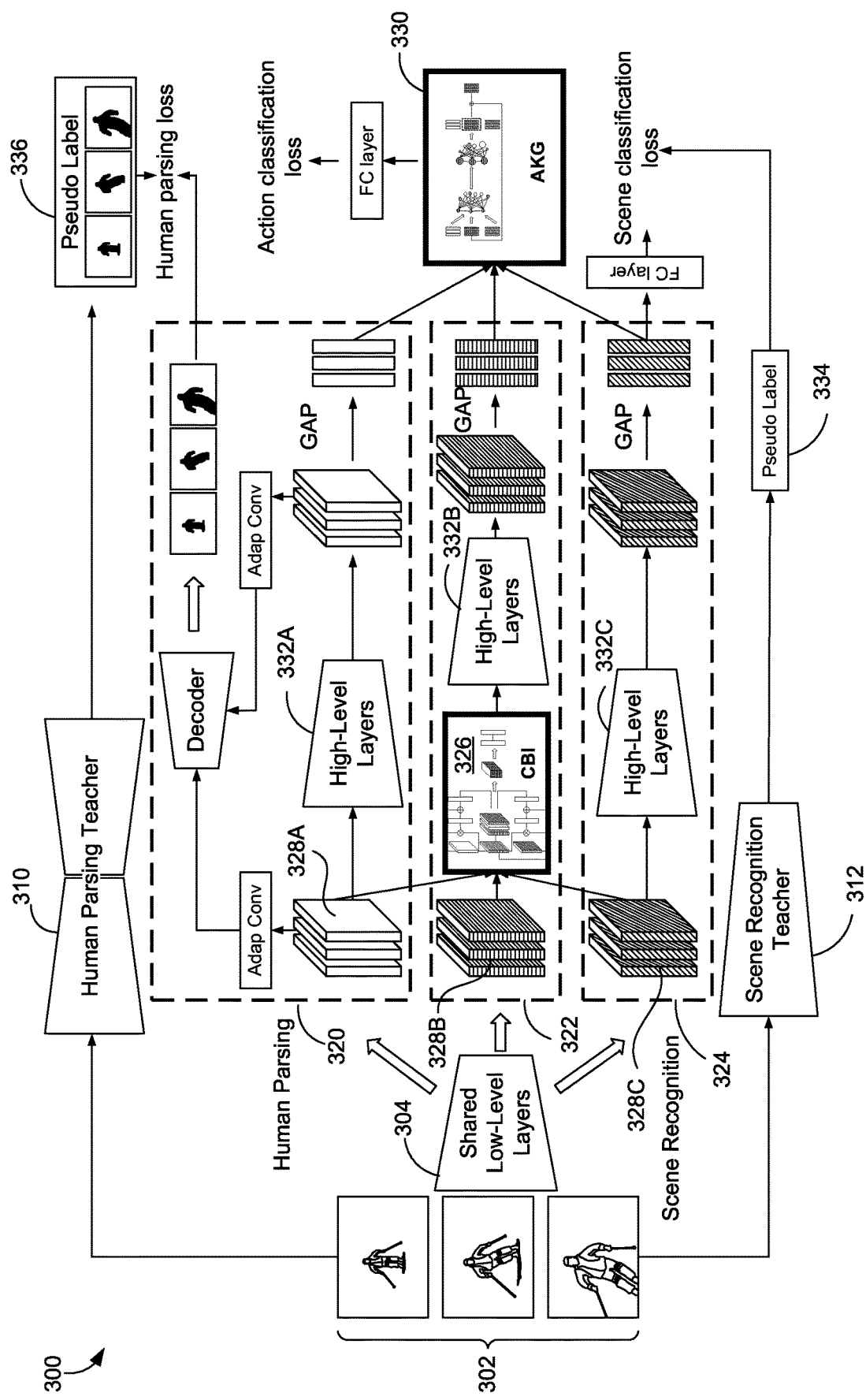
FIG. 3 is a schematic representation illustrating an exemplary system with a multi-branch architecture, suitable for use in implementing some embodiments of the present disclosure.

Referring now to FIG. 3, FIG. 3 is a schematic representation illustrating an exemplary system with a multi-branch architecture, suitable for use in implementing some embodiments of the present disclosure. In some embodiments, network 300 (e.g., Knowledge Integration Networks (KI-Net)) may be implemented with one or more CNNs.

At a high level, the network 300 distills the knowledge of a human and a scene from two teacher networks (e.g., human parsing teacher network 310 and scene recognition teacher network 312). The network 300 contains three branches (e.g., human parsing branch 320, action recognition branch 322, and scene recognition branch 324), and may enable knowledge integration by introducing a Cross Branch Integration (CBI) module 326 for encoding auxiliary knowledge from auxiliary knowledge layers 328A, 328B, and 328C (collectively referred to herein as "auxiliary knowledge layers 328") into the intermediate convolutional features, and an Action Knowledge Graph (AKG) 330 for effectively integrating high-level context information. The human parsing branch 320, the action recognition branch 322, and the scene recognition branch 324 may be jointly optimized during training, allowing for direct encoding of the knowledge of the human and the scene from video segments 302 into the network 300 for action recognition.

As mentioned above, network 300 has three branches. The action recognition branch 322 may leverage a Temporal Segment Network (TSN) structure, which may include a 2D network for use as a backbone. TSN may be able to model long-range temporal information by sparsely sampling a number of video segments 302 along a complete or larger segment of a video, and then average the representation of all the video segments 302. In some embodiments, TSN may be applied in a two-stream architecture, with a second stream for modelling motion information by utilizing optical flow. In further embodiments, the number of segments for training may be set by a developer and may vary depending on the application. In some experiments, $N_{seg}=3$ provided efficient training as well as a fair comparison against conventional methods.

The human parsing branch 320, the action recognition branch 322, and the scene recognition branch 324 may each share low-level layers 304 in a backbone corresponding to each branch. The low-level features may be generalized over three tasks (e.g., human parsing, action recognition, and scene recognition), and sharing features may allow the three tasks to be trained collaboratively with fewer parameters used.

The network 300 may include high-level layers 332A, 332B, and 332C (collectively referred to herein as "high-level layers 332") in each of the human parsing branch 320, the action recognition branch 322, and the scene recognition branch 324. In some embodiments, parameters may not be shared between the high-level layers 332. However, information may still be exchanged through various integration mechanisms.

The network 300 may explicitly incorporate scene context from the scene recognition branch 324 and human knowledge from the human parsing branch 320 into human action recognition. The human parsing teacher 310 and the scene recognition teacher 312 may be used to distill extra knowledge of the human and the scene from the video segments 302, which may provide additional supervision for the network 300. This may allow the network 300 to learn actions, scenes and human concepts simultaneously, and may enable explicit learning of multiple semantic concepts without additional manual annotations.

In some embodiments, the network 300 may employ the human parsing teacher network 310 and the scene recognition teacher network 312 to guide the human parsing branch 320, the action recognition branch 322, and the scene recognition branch 324. The human parsing teacher 310 network can provide a pseudo ground truth for human parsing via pseudo label 336. The scene recognition teacher 312 network can provide a pseudo ground truth for scene recognition via pseudo label 334.

In some embodiments, a large-scale dataset focused on semantic understanding of a person may be used to train the human parsing teacher network 310. For example, the Look into Person (LIP) dataset may be well suited for training the human parsing teacher network 310 because it is a human parsing dataset, which was created specifically for semantic segmentation of multiple parts of a human body. This dataset may provide training data where only certain parts of human body, such as a hand, are available. These body parts are commonly presented in video actions, such as actions from video segments 302. Furthermore, the original LIP dataset contains 19 semantic parts. Due to the relatively low resolution of the video segments 302, the pseudo label 336 generated by the human parsing teacher 310 may contain a certain amount of noisy pixel labels for fine-grained human parsing. Accordingly, all 19 human parts may be merged into a single human segmentation, which leads to much stronger robustness on segmentation results. The pseudo label 336 may operate as a pseudo human parsing ground truth for computing human parsing loss from the output of the human parsing branch 320. In some embodiments, the human parsing teacher network 310 may employ a segmentation network (e.g., PSPNet with DenseNet-121) as its backbone.

The scene recognition teacher network 312, in some embodiments, may use a large-scale scene recognition dataset (e.g., Places365) to train the scene recognition teacher network 312. Places365 contains 365 scene categories. By training the scene recognition teacher network 312 using a large-scale scene recognition dataset, the scene recognition teacher network 312 may determine a scene in the video segment 302 and output pseudo label 334, which may operate as a pseudo scene ground truth for computing scene classification loss in the network 300. Further, the scene recognition teacher network 312 may employ a deep residual learning neural network for image recognition (e.g., ResNet152) as the backbone of the scene recognition teacher network 312.

Intermediate representations generated by each of the human parsing branch 320, the action recognition branch 322, and the scene recognition branch 324 may be integrated by the CBI module 326 to form an integrated representation. The CBI module 326 may enable the network 300 to encode knowledge of a human in video segments 302 and the scene depicted in the video segments 302. For example, feature maps of the human parsing branch 320, the action recognition branch 322, and the scene recognition branch 324 may be used as gated modulation of main action features in the video segments 302 by implementing element-wise multiplication on the features. In some embodiments, the CBI module 326 may apply a residual-like connection with batch normalization and ReLU activation so that the feature maps of each of the human parsing branch 320, the action recognition branch 322, and the scene recognition branch 324 may directly interact with the main action features.

Action, human and scene features that are determined by the human parsing branch 320, the action recognition branch 322, and the scene recognition branch 324 may be integrated based on the AKG 330. By integrating the action, human and scene features, the AKG 330 may construct a knowledge graph to explicitly model a relationship and/or correlation among the features. Based on the knowledge graph, the AKG 330 may identify an action and/or activity depicted in the video segments 302. For example, the video segments 302 may depict a person skiing. The person, their clothing, any accessories (e.g., skis, poles, etc.) and other features of the person may be parsed from the video segments 302 by the human parsing branch 320. Movements of the person in the video segments 302 may be identified by the action recognition branch 322. A snowy background, a hill, a ski lift and other environment features of the scene in the video segments 302 may be identified by the scene recognition branch 324. The AKG 330 may then integrate the features parsed by the human parsing branch 320 and the movements of the person identified by the action recognition branch 322 with the scene identified by the scene recognition branch 324 to determine that the video segments 302 depict a person skiing.

In some embodiments, an object branch may be added by distillation. However, in the case of low resolution and motion blur, it may be difficult to identify an object in a video with a sufficient degree of certainty. Further, categories of object detection/segmentation may be limited, while for action recognition, the objects involved are much more diverse. In some embodiments, a pretrained model (e.g., ImageNet) may be used to initialize the framework instead of forcing it to "remember" everything from it.

Figure 4:
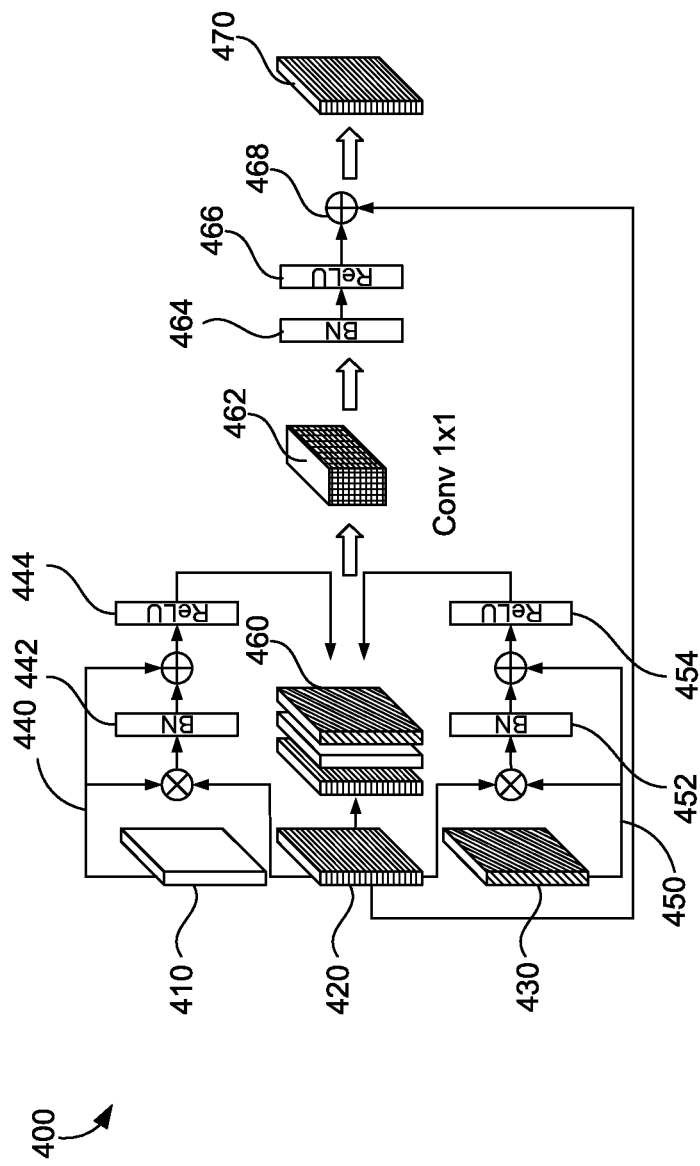
FIG. 4 is a schematic representation illustrating an exemplary cross branch integration module, suitable for use in implementing some embodiments of the present disclosure.

Referring now to FIG. 4, FIG. 4 is a schematic representation illustrating an exemplary cross branch integration (CBI) module 400, suitable for use in implementing some embodiments of the present disclosure. In general, the CBI module 400 may aggregate intermediate features learned from a human parsing branch and a scene recognition branch into an action recognition branch, which may enable the model to encode knowledge of a human and a scene depicted in one or more video segments. In some embodiments, a human parsing feature map 410, an action feature map 420, and a scene feature map 430 of the human parsing branch, an action recognition branch, and the scene recognition branch, respectively, may be used as gated modulation of the main action features, by implementing element-wise multiplication on them, as shown in FIG. 4. In some embodiments, a residual-like connection 440 for the human parsing feature map 410 may be applied with batch normalization 442 and ReLU activation 444 to allow the human parsing feature map 410 of the human parsing branch to directly interact with the action features of the action features map 420. Similarly, a residual-like connection 450 for the scene feature map 430 may be applied with batch normalization 452 and ReLU activation 454 to allow the scene feature map 430 of the scene recognition branch to directly interact with the action features of the action features map 420. Subsequently, the feature map 410, the action feature map 420, and the scene feature map 430 may be concatenated along the channel dimension into a concatenated feature map 460. The concatenated feature map 460 may then be passed to a 1×1 convolution layer 462 for reducing the number of channels. In this way, input channels and output channels are guaranteed to be identical, so that the CBI module 400 may be applied at any stage in the network, such as network 300 of FIG. 3. The output of the 1×1 convolution layer 462 may further be applied with batch normalization 464 and ReLU activation 466. This output may then be combined with features of the action features map 420 at operation 468 to generate an integrated feature map 470.

Figure 5:
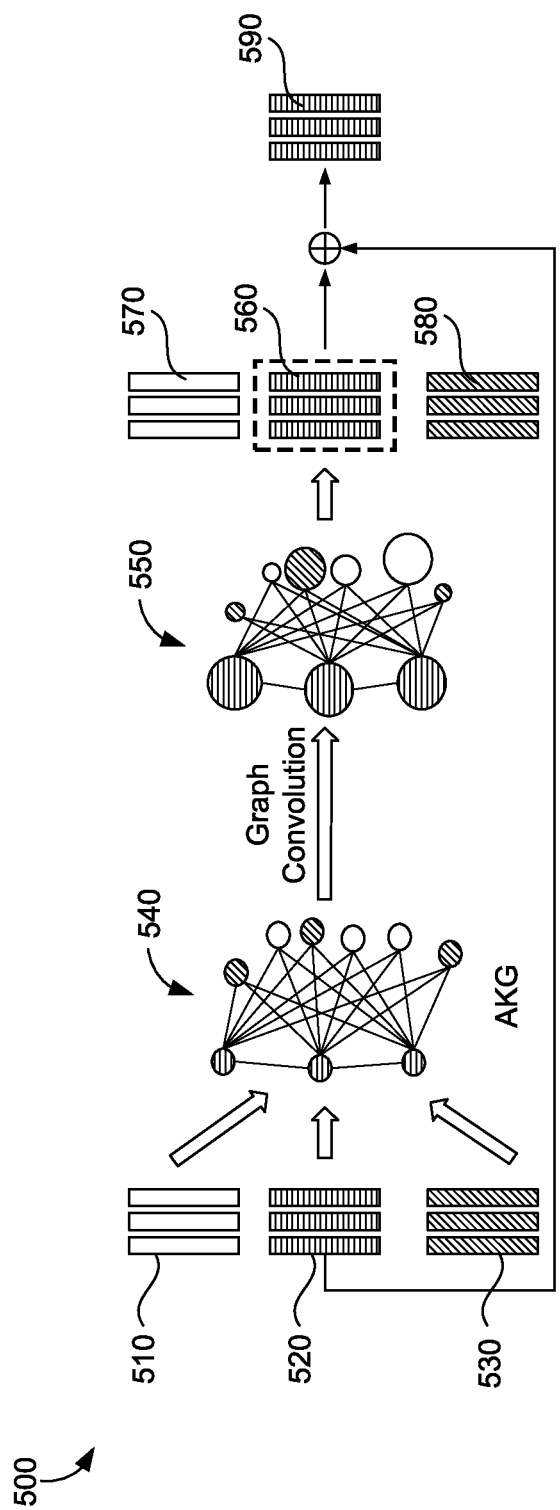
FIG. 5 is a schematic representation illustrating an exemplary action knowledge graph module, suitable for use in implementing some embodiments of the present disclosure.

Referring now to FIG. 5, FIG. 5 is a schematic representation illustrating exemplary action knowledge graph (AKG) module 500, suitable for use in implementing some embodiments of the present disclosure. In some embodiments, AKG module 500 may utilize an outcome of one or more action recognition nodes to identify an action in one or more video segments.

In various embodiments, the AKG module 500 may apply global average pooling individually to feature vectors on each of a human parsing branch 510, an action recognition branch 520, and a scene recognition branch 530. As a result of the global average pooling, the AKG module 500 may obtain three groups of representation vectors with the same size. Each group may contain $N_{seg}$ feature vectors, corresponding to $N_{seg}$ input frames, where $N_{seg}$ may be the number of segments in a Temporal Segment Network (TSN) structure. The AKG module 500 may then construct an action knowledge graph 540 to explicitly model pair-wise correlations among the representation vectors. To this end, the AKG module 500 may generate the action knowledge graph 540 using the high-level features of a human parsing task, an action recognition task, and a scene recognition task. The AKG module 500 may further apply one or more graph convolutional networks 550 on the action knowledge graph 540 to further integrate high-level semantic knowledge.

In some embodiments, the action knowledge graph 540 may model a relationship among features from the human parsing branch 510, an action recognition branch 520, and a scene recognition branch 530. Specifically, there may be $N=3\times N_{seg}$ total nodes in the action knowledge graph 540, denoted as $X=\{x_i^{action}, x_i^{scene}, x_i^{human}|i=1, \ldots, N_{seg}\}$, where the nodes $x_i^{action}, x_i^{scene}, x_i^{human} \in R^d$, with d indicating the channel dimension of the last convolutional layer in the backbone. The graph $G \in R^{N \times N}$ represents the pair-wise relationship among the nodes, with edge $G_{ab}$ indicating the relationship between node $x_b$ and node $x_a$.

The disclosed system may build correlations between the human parsing task, the action recognition task, and the scene recognition task. Therefore, in some embodiments, it is not necessary to construct a fully-connected action knowledge graph 540. The system may only activate edges which are directly connected to an action node $x_i^{action}$ and set the others to 0. Moreover, the system may implement the action knowledge graph 540 by computing an element-wise product of G and an edge mask matrix $I_{mask}$. The mask $I_{mask}$ is a 0 or 1 matrix with the same size as G, where the edges between human nodes and scene nodes are set to 0, and otherwise 1.

Various embodiments may employ different forms of relation function $f$ for computing a relationship between knowledge nodes. For example, the relation function may be a dot product. A dot product is a frequently-used function for modelling the similarity between two vectors. It is simple but effective and parameter-free. Another extension of dot product is the embedded dot product, which projects the input vectors onto a subspace, and then applies dot product, by utilizing two learnable weight matrices, $$f(x_a, x_b) = x_a^T x_b, \quad (1)$$

$$f(x_a, x_b) = \theta(x_a^T)\phi(x_b). \quad (2)$$

In some embodiments, the relation may be a concatenation. The relation module may be obtained by concatenation as in Eq. 3 below, where [•,•] denotes the concatenation operation, and W represents the learnable weight matrix that projects the concatenated vector into a scalar.

$$f(x_a, x_b) = \text{ReLU}(W[\theta(x_a), \phi(x_b)]), \quad (3)$$

In some embodiments, a sum of all edges pointing to the same node must be normalized to 1, and then the graph convolution 550 can be applied to the normalized action knowledge graph 540. In some embodiments, the softmax function may be used for implementing normalization.

$$G_{ab} = \frac{e^{f(x_a, x_b)}}{\sum_{b=1}^{N} e^{f(x_a, x_b)}}. \quad (4)$$

This normalization function essentially casts dot product into Gaussian function, thus the system may not require the use of Gaussian or embedded Gaussian functions directly for learning the relations.

In some embodiments, the graph convolution 550 may be applied on the constructed action knowledge graph 540 for aggregating high-level sematic knowledge of a human and a scene (i.e., high-level auxiliary features) into an aggregated action recognition branch 560. The aggregated action recognition branch 560 may then be combined, at least in part, with features from the action recognition branch 520 to generate one or more output feature vectors 590 for action recognition. In some embodiments, human segmentation feature vector(s) 570 and/or scene segmentation feature vector(s) 580 may be accessed and/or combined to generate the one or more output feature vectors 590 for action recognition. The behavior of a graph convolution layer can be formulated as Eq. 5 below, where $I_{mask}$ is the edge mask matrix mentioned, $G \in R^{N \times N}$ is the matrix of the constructed knowledge graph. $X \in R^{N \times d}$ is the input to the GCN, $W \in R^{d \times d}$ is the learnable weight matrix for graph convolution 550, and $\sigma$ is the activation function. In operation, the system may apply one or more graph convolution layers for modelling rich high-level context information. The output of graph convolution 550, $Z \in R^{N \times d}$, may be the same size as the input X. In some embodiments, the system may use the $N_{seg}$ vectors from action recognition branch 520 for final action classification.

$$Z = \sigma(I_{mask} \odot GXW), \quad (5)$$

Regarding the technical character of joint learning, the disclosed three-branch architecture enables an end-to-end joint learning of action recognition, human parsing and scene recognition. The multi-task loss function is computed as Eq. 6, where $L_{action}$ and $L_{scene}$ are cross-entropy losses for classification, $L_{huma}$ is a cross-entropy loss for semantic segmentation. For scene recognition and human parsing, the loss of each segment may be calculated individually and then averaged. The ground truth for action recognition may be provided by a training dataset, while the ground truth of scene recognition and human parsing may be provided by one or more teacher networks as pseudo labels for knowledge distillation. In some embodiments, the system may empirically set $\lambda_1=1$ for main tasks, $\lambda_2=0.01$ and $\lambda_3=0.01$ for the two auxiliary tasks.

$$L = \lambda_1 L_{action} + \lambda_2 L_{human} + \lambda_3 L_{scene}, \quad (6)$$

Regarding learnable parameters for auxiliary tasks, conventional solutions may encode extra knowledge by directly using teacher networks whose parameters are fixed. In contrast, the disclosed system's three-branch framework with knowledge distillation enables a joint learning of three individual tasks from one or more video segments. Advantageously, this allows for training three tasks more collaboratively, providing a more principled approach for knowledge integration.

Figure 6:
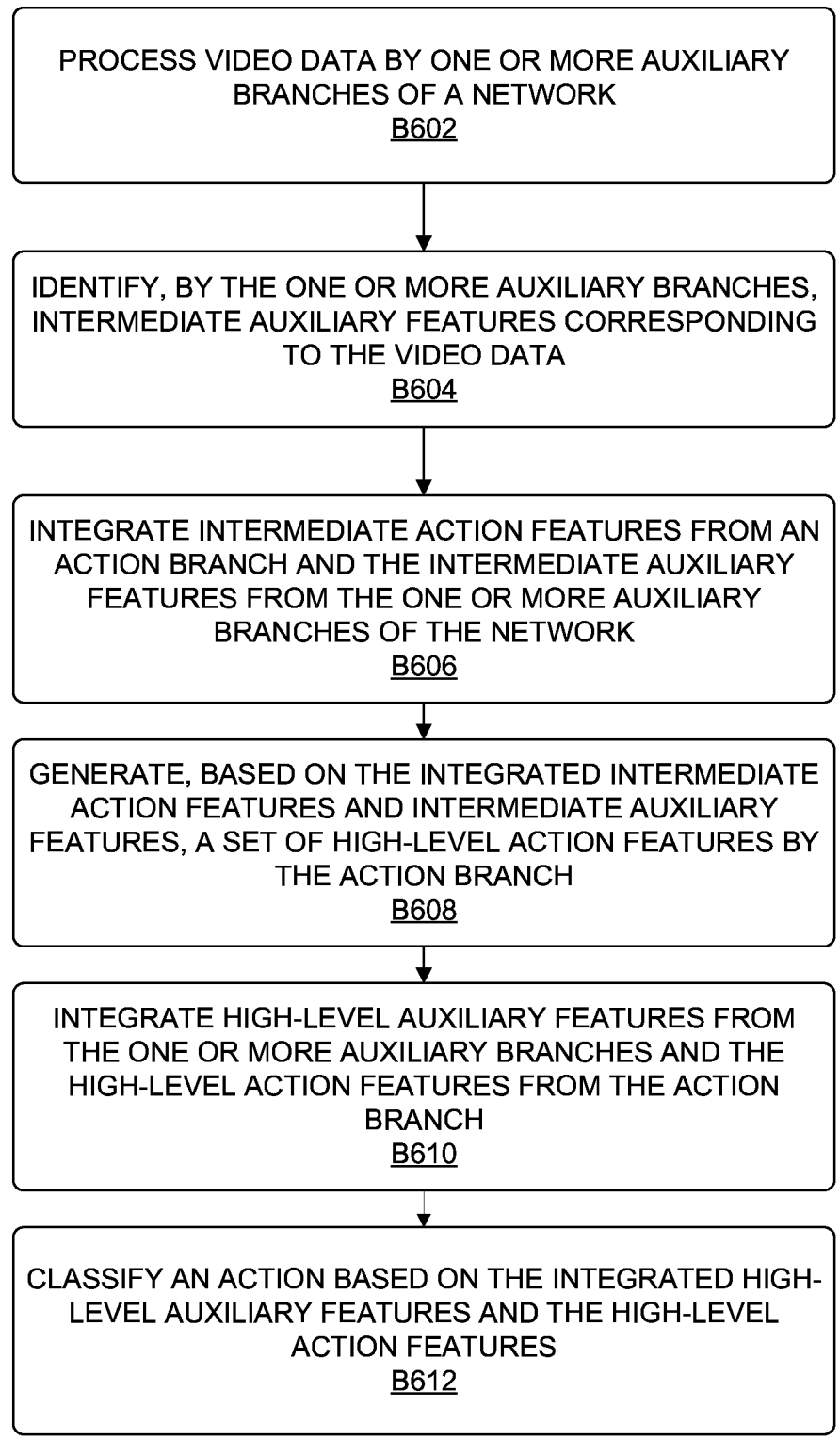
FIG. 6 is a flow diagram illustrating an exemplary process of action recognition, suitable for use in implementing some embodiments of the present disclosure.
Figure 7:
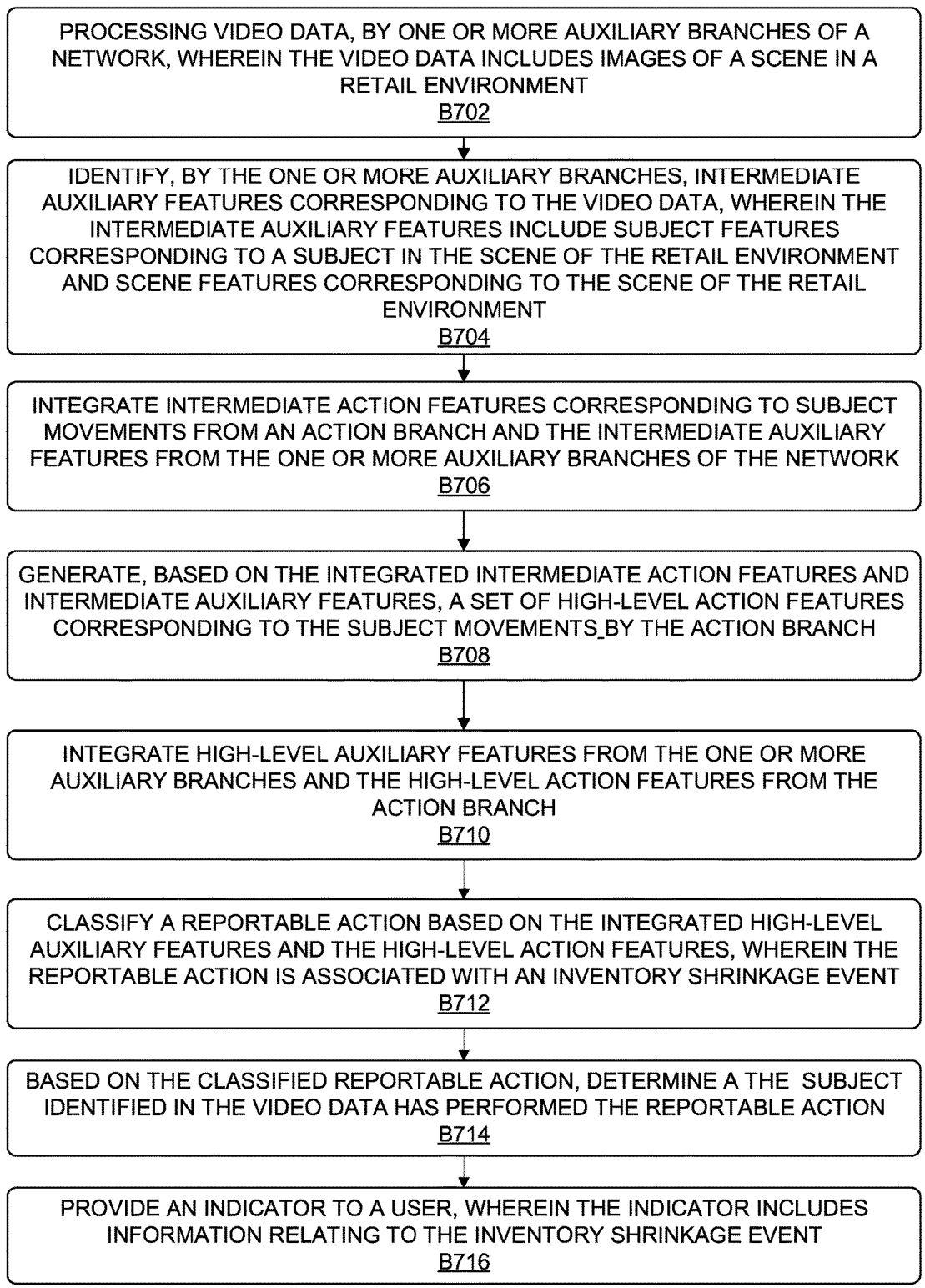
FIG. 7 is a flow diagram illustrating an exemplary process of action recognition and response, suitable for use in implementing some embodiments of the present disclosure.

Referring now to FIGS. 6 and 7, each block of methods 600 and 700, described herein, comprise a computing process that may be performed using any combination of hardware, firmware, and/or software. For instance, various functions may be carried out by a processor executing instructions stored in memory. The methods 600 and 700 may also be embodied as computer-usable instructions stored on computer storage media. The methods 600 and 700 may be provided by a standalone application, a service or hosted service (standalone or in combination with another hosted service), or a plug-in to another product, to name a few. However, these methods may additionally or alternatively be executed by any one system, or any combination of systems, including, but not limited to, those described herein.

FIG. 6 is a flow diagram is provided that illustrates an exemplary process 600 for action recognition, (e.g., performed by action recognition system 210 of FIG. 2), suitable for use in implementing some embodiments of the present disclosure. The method, at block 602, includes processing video data, by one or more auxiliary branches of a network. For example, a three-branch architecture (e.g., Knowledge Integration Networks (referred as KINet)) may be used in a machine learning model to process video data for action and/or activity recognition.

The method, at block 604, includes identifying, by the one or more auxiliary branches, intermediate auxiliary features corresponding to the video data. For example, each branch of the three branch architecture may identify intermediate features in video data.

The method, at block 606, includes integrating intermediate action features from an action branch and the intermediate auxiliary features from the one or more auxiliary branches of the network. For example, the knowledge encoding system described previously in connection with FIG. 3 may include a cross branch integration (CBI) module that may be used for integrating/fusing intermediate features from the three auxiliary branches to generate a set of high-level features.

The method, at block 608, includes generating, based on the integrated intermediate action features and intermediate auxiliary features, a set of high-level action features by the action branch. For example, the knowledge encoding system may include a cross branch integration (CBI) module that may be used for integrating/fusing intermediate features from the three auxiliary branches to generate a set of high-level features.

The method, at block 610, includes integrating high-level auxiliary features from the one or more auxiliary branches and the high-level action features from the action branch. For example, the knowledge encoding system may include an action knowledge graph (AKG) that may be used for integrating/fusing high-level information (e.g., context information, convolutional features) from the three auxiliary branches.

The method, at block 612, includes classifying an action based on the integrated high-level auxiliary features and the high-level action features. For example, embodiments of the disclosed technical application can classify actions and or activities in a video based on auxiliary information, such as the knowledge of the actor related to the actions and the scene related to the actions.

Referring now to FIG. 7, a flow diagram is provided that illustrates an exemplary process of action recognition and response, (e.g., performed by action recognition system 210 of FIG. 2), suitable for use in implementing some embodiments of the present disclosure. The method, at block 702, includes processing video data, by one or more auxiliary branches of a network, wherein the video data includes images of a scene in a retail environment. For example, a three-branch architecture (e.g., Knowledge Integration Networks (referred as KINet)) may be used in a machine learning model to process video data for action and/or activity recognition.

The method, at block 704, includes identifying, by the one or more auxiliary branches, intermediate auxiliary features corresponding to the video data, wherein the intermediate auxiliary features include subject features corresponding to a subject in the scene of the retail environment and scene features corresponding to the scene of the retail environment.

The method, at block 706, includes integrating intermediate action features corresponding to subject movements from an action branch and the intermediate auxiliary features from the one or more auxiliary branches of the network. For example, the knowledge encoding system may include a cross branch integration (CBI) module that may be used for integrating/fusing intermediate features from the three auxiliary branches to generate a set of high-level features.

The method, at block 708, includes generating, based on the integrated intermediate action features and intermediate auxiliary features, a set of high-level action features corresponding to the subject movements by the action branch. For example, the knowledge encoding system may include a cross branch integration (CBI) module that may be used for integrating/fusing intermediate features from the three auxiliary branches to generate a set of high-level features The method, at block 710, includes integrating high-level auxiliary features from the one or more auxiliary branches and the high-level action features from the action branch. For example, the knowledge encoding system may include an action knowledge graph (AKG) that may be used for integrating/fusing high-level information (e.g., context information, convolutional features) from the three auxiliary branches.

The method, at block 712, includes classifying a reportable action based on the integrated high-level auxiliary features and the high-level action features, wherein the reportable action is associated with an inventory shrinkage event. For example, embodiments of the disclosed technical application can classify actions and or activities in a video based on auxiliary information, such as the knowledge of the actor related to the actions and the scene related to the actions.

The method, at block 714, includes determining the subject identified in the video data has performed the reportable action based on the classified reportable action. For example, the disclosed system is adapted to recognize a reportable action based on video-level temporal evolution of spatio-temporal features in video sequence, such as the whereabouts of a product and its spatio-temporal relationship with a subject and other objects detected in a video.

The method, at block 716, includes providing an indicator to a user, wherein the indicator includes information relating to the inventory shrinkage event. For example, when the system identifies an action and/or activity associated with shrinkage, the disclosed system may generate and send a warning message, including one or more images, video segments relevant to the action and/or activity, a timestamp corresponding to the action and/or activity, location data (e.g., location within a store, GPS location, etc.), image data corresponding to inventory that may have been stolen (e.g., stock image and/or actual image), and other relevant data to a designated device to warn a human operator.

In conclusion, the disclosed methods are able to incorporate external semantic cues into action recognition via knowledge distillation. Furthermore, a two-level knowledge encoding mechanism is disclosed by introducing a Cross Branch Integration (CBI) module for intergrading the extra knowledge into medium-level convolutional features, and an Action Knowledge Graph (AKG) for learning meaningful high-level context information.

It is understood that various features, sub-combinations, and modifications of the embodiments described herein are of utility and may be employed in other embodiments without reference to other features or sub-combinations. Moreover, the order and sequences of steps/blocks shown in the above example processes are not meant to limit the scope of the present disclosure in any way and, in fact, the steps/blocks may occur in a variety of different sequences within embodiments hereof. Such variations and combinations thereof are also contemplated to be within the scope of embodiments of this disclosure.

Referring to FIG. 8, an exemplary operating environment for implementing various aspects of the technologies described herein is shown and designated generally as computing device 800. Computing device 800 is but one example of a suitable computing environment and is not intended to suggest any limitation as to the scope of use of the technologies described herein. Neither should the computing device 800 be interpreted as having any dependency or requirement relating to any one or combination of components illustrated.

The technologies described herein may be described in the general context of computer code or machine-useable instructions, including computer-executable instructions such as program components, being executed by a computer or other machine. Generally, program components, including routines, programs, objects, components, data structures, and the like, refer to code that performs particular tasks or implements particular abstract data types. The technologies described herein may be practiced in a variety of system configurations, including handheld devices, consumer electronics, general-purpose computers, and specialty computing devices, etc. Aspects of the technologies described herein may also be practiced in distributed computing environments where tasks are performed by remote-processing devices that are connected through a communications network.

With continued reference to FIG. 8, computing device 800 includes a bus 810 that directly or indirectly couples the following devices: memory 820, processors 830, presentation components 840, input/output (I/O) ports 850, I/O components 860, and an illustrative power supply 870. Bus 810 may include an address bus, data bus, or a combination thereof. Although the various blocks of FIG. 8 are shown with lines for the sake of clarity, in reality, delineating various components is not so clear and, metaphorically, the lines would more accurately be grey and fuzzy. For example, one may consider a presentation component such as a display device to be an I/O component. The inventors hereof recognize that such is the nature of the art and reiterate that the diagram of FIG. 8 is merely illustrative of an exemplary computing device that can be used in connection with different aspects of the technologies described herein. Distinction is not made between such categories as "workstation," "server," "laptop," "handheld device," "smartphone," etc., as all are contemplated within the scope of FIG. 8 and refers to "computer" or "computing device."

Computing device 800 typically includes a variety of computer-readable media. Computer-readable media can be any available media that can be accessed by computing device 800 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technologies for storage of information, such as computer-readable instructions, data structures, program modules, or other data.

Computer storage media includes RAM, ROM, EEPROM, flash memory or other memory technologies, CD-ROM, digital versatile disks (DVD), or other optical disk storage, magnetic cassettes, magnetic tape, magnetic disk storage or other magnetic storage devices. Computer storage media does not comprise a propagated data signal.

Communication media typically embodies computer-readable instructions, data structures, program modules, or other data in a modulated data signal, such as a carrier wave or other transport mechanism, and includes any information delivery media. The term "modulated data signal" means a signal that has its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 820 includes computer storage media in the form of volatile and/or nonvolatile memory. The memory 820 may be removable, non-removable, or a combination thereof. Exemplary memory includes solid-state memory, hard drives, optical-disc drives, etc. Computing device 800 includes processors 830 that read data from various entities, such as bus 810, memory 820, or I/O components 860. Presentation component(s) 840 present data indications to a user or other device. Exemplary presentation components 840 include a display device, speaker, printing component, vibrating component, etc. I/O ports 850 allow computing device 800 to be logically coupled to other devices, including I/O components 860, some of which may be built in.

In various embodiments, memory 820 includes, in particular, temporal and persistent copies of action recognition logic 822. Action recognition logic 822 includes instructions that, when executed by processor 830, result in computing device 800 performing functions, such as, but not limited to, process 600, process 700, or other processes discussed herein. In various embodiments, action recognition logic 822 includes instructions that, when executed by processors 830, result in computing device 800 performing various functions associated with, but not limited to, various components in connection with action recognition system 210 in FIG. 2; various components in connection with FIGS. 3-5.

In some embodiments, processors 830 may be packed together with action recognition logic 822. In some embodiments, processors 830 may be packaged together with action recognition logic 822 to form a System in Package (SiP). In some embodiments, processors 830 can be integrated on the same die with action recognition logic 822. In some embodiments, processors 830 can be integrated on the same die with action recognition logic 822 to form a System on Chip (SoC).

Illustrative I/O components include a microphone, joystick, game pad, satellite dish, scanner, printer, display device, wireless device, a controller (such as a stylus, a keyboard, and a mouse), a natural user interface (NUI), and the like. In aspects, a pen digitizer (not shown) and accompanying input instrument (also not shown but which may include, by way of example only, a pen or a stylus) are provided in order to digitally capture freehand user input. The connection between the pen digitizer and processor(s) 830 may be direct or via a coupling utilizing a serial port, parallel port, and/or other interface and/or system bus known in the art. Furthermore, the digitizer input component may be a component separate from an output component, such as a display device. In some aspects, the usable input area of a digitizer may coexist with the display area of a display device, be integrated with the display device, or may exist as a separate device overlaying or otherwise appended to a display device. Any and all such variations, and any combination thereof, are contemplated to be within the scope of aspects of the technologies described herein.

I/O components 860 include various graphical user interface (GUI), which allow users to interact with computing device 800 through graphical elements or visual indicators. Interactions with a GUI usually are performed through direct manipulation of graphical elements in the GUI. Generally, such user interactions may invoke the business logic associated with respective graphical elements in the GUI. Two similar graphical elements may be associated with different functions, while two different graphical elements may be associated with similar functions. Further, a same GUI may have different presentations on different computing devices, such as based on the different graphical processing units (GPUs) or the various characteristics of the display.

Computing device 800 may include networking interface 880. The networking interface 880 includes a network interface controller (NIC) that transmits and receives data. The networking interface 880 may use wired technologies (e.g., coaxial cable, twisted pair, optical fiber, etc.) or wireless technologies (e.g., terrestrial microwave, communications satellites, cellular, radio and spread spectrum technologies, etc.). Particularly, the networking interface 880 may include a wireless terminal adapted to receive communications and media over various wireless networks. Computing device 800 may communicate with other devices via the networking interface 880 using radio communication technologies. The radio communications may be a short-range connection, a long-range connection, or a combination of both a short-range and a long-range wireless telecommunications connection. A short-range connection may include a Wi-Fi® connection to a device (e.g., mobile hotspot) that provides access to a wireless communications network, such as a wireless local area network (WLAN) connection using the 802.11 protocol. A Bluetooth, Ultra-Wideband (UWB), near field communication (NFC), ZigBee, and/or Infrared (IR) connection to another computing device are additional examples of a short-range connection. A long-range connection may include a connection using various wireless networks, including 1G, 2G, 3G, 4G, 5G, etc., or based on various standards or protocols, including General Packet Radio Service (GPRS), Enhanced Data rates for GSM Evolution (EDGE), Global System for Mobiles (GSM), Code Division Multiple Access (CDMA), Time Division Multiple Access (TDMA), Long-Term Evolution (LTE), 802.16 standards, etc.

The technologies described herein have been described in relation to particular aspects, which are intended in all respects to be illustrative rather than restrictive. While the technologies described herein are susceptible to various modifications and alternative constructions, certain illustrated aspects thereof are shown in the drawings and have been described above in detail. It should be understood, however, there is no intention to limit the technologies described herein to the specific forms disclosed, but on the contrary, the intention is to cover all modifications, alternative constructions, and equivalents falling within the spirit and scope of the technologies described herein.

Further, by way of example, and not limitation, the following examples are provided to illustrate various embodiments, in accordance with at least one aspect of the disclosed technologies.

Examples in the first group comprises a method, a computer system adapted to perform the method, or a computer storage device storing computer-useable instructions that cause a computer system to perform the method.

Example 1 in the first group includes operations for distilling auxiliary information from one or more auxiliary branches of a network.

Example 2 may include any subject matter of examples in the first group, and further includes operations for integrating intermediate features from an action branch and the one or more auxiliary branches of the network.

Example 3 may include any subject matter of examples in the first group, and further includes operations for generating high-level features from the action branch, e.g., based on the integrated intermediate features.

Example 4 may include any subject matter of examples in the first group, and further includes operations for integrating high-level features from the one or more auxiliary branches and the high-level features from the action branch.

Example 5 may include any subject matter of examples in the first group, and further includes operations for classifying an action based on the integrated high-level features.

Experimental data provided herein verifies improvements described in the disclosure for collaboratively training a plurality of tasks, which provides a more principled approach for knowledge integration. To verify the effectiveness of the disclosed network (e.g., KINet), the inventors conducted experiments on a large-scale action recognition dataset Kinetics-400, which contains 400 action categories, with about 240k videos for training and 20k videos for validation. The inventors then examined the generalization ability of the network (e.g., KINet) by transferring a learned representation to a small dataset UCF-101, containing 101 action categories with 13,320 videos in total. Following previous standard criterion, the inventors divided the total videos into 3 training/testing splits and the results of the three splits were averaged as the final result.

The inventors used ImageNet pretrained weights to initialize a framework. Following a sampling strategy, the inventors uniformly divided the video(s) into $N_{seg}=3$ segments, and randomly selected a frame out of each segment. The inventors first resized every frame to size 256×340 and then applied multiscale cropping for data augmentation. For Kinetics, the inventors utilized a schotastic gradient descent (SGD) optimizer with initial learning rate set to 0.01, which drops by 10 at epoch 20, 40 and 60. The model is totally trained for 70 epochs. The inventors set the weight decay to be $10^{-5}$ and the momentum to be 0.9. For UCF-101. Following, the inventors fine tune the pretrained weights on Kinetics, where they have all but the first batch normalization layer frozen and the model is trained for 80 epochs.

For fair comparison, the inventors also followed a previous work by uniformly sampling 25 segments from each video and selecting one frame out of each segment. The inventors cropped the 4 corners and the center of each frame and then flipped them so that 10 images are obtained. In total, there are 25×10=250 images for each video. The inventors used a sliding window of $N_{seg}=3$ on the 25 test segments. The results were averaged finally to produce the video-level prediction. Note that during inference, the decoder of the human parsing branch and the classifier (e.g., fully connected layer) of the scene recognition branch can be removed, since the main task is action recognition. This makes it extremely efficient to transfer the learned representation to other datasets.

TABLE 1

Ablation study for each components of KINet on Kinetics-400.

| Method | Settings | top-1 | gain |
|---|---|---|---|
| *Baseline | TSN-ResNet50 | 69.5 | — |
| *KD + Multitask | Baseline + human | 70.3 | +0.8 |
| | Baseline + scene | 70.0 | +0.5 |
| | Baseline + human + scene | 70.6 | +1.1 |
| *CBI + Multitask | 1 CBI @ res4 | 71.1 | +1.6 |
| | 2 CBI @ res4 | 71.2 | +1.7 |
| | 1 CBI @ res4 + 1 CBI @ res5 | 71.8 | +2.3 |
| | 2 CBI @ res4 + 1 CBI @ res5 | 71.5 | +2.0 |

TABLE 1-continued

Ablation study for each components of KINet on Kinetics-400.

| Method | Settings | top-1 | gain |
|---|---|---|---|
| *AKG + Multitask | AKG + dot product | 71.7 | +2.2 |
| | AKG + E-dot product | 71.6 | +2.1 |
| | AKG + concatenation | 71.2 | +1.7 |
| | *KINet | | |
| | KINet-ResNet50 | 72.4 | +2.9 |

The inventors further performed an ablation study on kinetics. For this, the inventors conducted extensive experiments on large scale dataset Kinetics to study our framework. In this study, the inventors used TSN-ResNet50 as baseline.

TABLE 2

The performance of the disclosed KINet, with comparison on parameters.

| methods | top-1 | Parameters |
|---|---|---|
| TSN-ResNet50 | 69.5 | 24.4M |
| TSN-ResNet200 | 70.7 | 64.5M |
| KINet-ResNet50 | 72.4 | 56.9M |

As part of the ablation study, the inventors performed experiments relating to multitask learning with knowledge distillation. First, in order to show that distilling external knowledge does help with action recognition, the inventors incorporated human parsing and scene recognition into the action recognition network, by jointly learning these three tasks via knowledge distillation, yet without applying a cross branch integration (CBI) module or an Action Knowledge Graph (AKG) here. As shown in Table 1 above, the multitask learning with knowledge distillation outperforms the baseline. When action recognition and human parsing are jointly trained, the top-1 accuracy increases 0.8%. When action recognition and scene recognition are jointly trained, the top-1 accuracy increases 0.5%. When three tasks are jointly trained, the top-1 accuracy increases 1.1%.

Further, the inventors performed experiments using the CBI module. Here, instead of simple multitask learning, the inventors applied the CBI module to enable intermediate feature exchange. As shown in Table 1 above, aggregating human and scene knowledge into action branch strengthens the learning ability of action branch. The inventors further employed multiple CBI modules at different stages, showing that higher accuracy can be obtained. According to experiment results, the inventors finally applied 1 CBI at res4 and 1 CBI at res5 for a balance between accuracy and efficiency.

Further, the inventors performed experiments using the AKG. The AKG is applied at the late stage of the framework, with 3 possible relation function as discussed herein. The inventors compared their performance in Table 1. As noted by the inventors, the AKG boosts performance by aggregating multiple branches and models the relation among action, human and scene representations. the inventors found that the dot product and embedded dot product are comparable, which are slightly better than ReLU concatenation. The inventors choose to use dot product as the relation function in the remaining experiments.

TABLE 3

KINet consistently improve the performance with different backbones.

| Backbones | TSN top-1 | KINet top-1 | Gain |
|---|---|---|---|
| ResNet50 | 69.5 | 72.4 | +2.9 |
| BN-Inception | 69.1 | 71.8 | +2.7 |
| Inception V3 | 72.5 | 74.1 | +1.6 |

TABLE 4

Learnable auxiliary branches is better than pre-trained fixed ones for action recognition.

| methods | top-1 |
|---|---|
| BaselineTSN-ResNet50 | 69.5 |
| Fixed auxiliary branches KINet-ResNet50 | 70.5 |
| Learnable auxiliary branches KInet-ResNet50 | 72.4 |

TABLE 5

Comparison with state-of-the-art on Kinetics.

| | Model | Backbone | top-1 | top-5 |
|---|---|---|---|---|
| *2D Backbones | TSN | ResNet50 | 69.5 | 88.9 |
| | TSN | ResNet200 | 70.7 | 89.2 |
| | TSN | BNInception | 69.1 | 88.7 |
| | TSN | Inception V3 | 72.5 | 90.2 |
| | StNet | ResNet50 | 69.9 | — |
| | StNet | ResNet101 | 71.4 | — |
| | TBN | ResNet50 | 70.1 | 89.3 |
| | Two-stream TSN | Inception V3 | 76.6 | 92.4 |
| *3D Backbones | ARTNet | ARTNet ResNet18 + TSN | 70.7 | 89.3 |
| | ECO | ECO 2D + 3D | 70.0 | 89.4 |
| | S3D-G | S3D Inception | 74.7 | 93.4 |
| | Nonlocal Network | I3D ResNet101 | 77.7 | 93.3 |
| | SlowFast | SlowFast 3D ResNet101 + NL | 79.8 | 93.9 |
| | I3D | I3D Inception | 71.1 | 89.3 |
| | Two-stream I3D | I3D Inception | 74.2 | 91.3 |
| *2D Backbones | KINet (Ours) | BN-Inception | 71.8 | 89.7 |
| | KINet (Ours) | ResNet50 | 72.4 | 90.3 |
| | KINet (Ours) | Inception V3 | 74.1 | 91.0 |
| | Two-stream KINet (Ours) | Inception V3 | 77.8 | 93.1 |

TABLE 6

Comparison with state-of-the-art on UCF-101. "TS" indicates "Two-stream".

| Model | Backbone | top-1 |
|---|---|---|
| TS TSN [et al.2016a] | BNInception | 97.0 |
| TS TSN [et al.2016a] | Inception V3 | 97.3 |
| TS I3D (Carreira at al. 2017) | I3D Inception | 98.0 |
| StNet-RGB [et al.2019] | ResNet50 | 93.5 |
| StNet-RGB [et al.2019] | ResNet101 | 94.3 |
| TSKINet | Inception V3 | 97.8 |

Regarding the KINet Framework, the inventors combined previously mentioned components into the baseline, (i. e. TSN ResNet50) for RGB-based action recognition with the Knowledge Integration Networks. As shown in Table 1, the inventors found that the top-1 accuracy has been boosted to 72.4%, while the baseline is 69.5%. This significant improvement of 2.9% on video action recognition benchmark proves the effectiveness of the disclosed framework.

Turning to effective parameters, as shown in Table 2, although the experiment method introduces more parameters due to the multi-branch setting, the overall amount of parameters is still less than that of TSN-ResNet200, yet with higher accuracy. This comparison proves that the functionality of the framework contributes vitally to action recognition, not just because of the extra parameters introduced.

The inventors implemented the KINet with different backbones, to verify the generalization ability. The results in Table 3 show that the KINet can consistently improve the performance with different backbones.

The inventors performed experiments relating to learnable parameters. For example, to verify the impact of joint learning, the inventors directly used the human parsing teacher network and the scene recognition network to provide auxiliary information, with their weights fixed. The results are shown in Table 4. The KINet outperforms the fixed method significantly. The inventors explain this phenomenon by stressing the importance of pseudo label guided learning. With KINet, the auxiliary branches may be jointly trained with the action recognition branch using the pseudo label, so that the intermediate features of scene and human can be fine-tuned to suit action recognition better. Yet for the fixed method in previous works, the auxiliary representation cannot be fine-tuned. Although the fixed auxiliary networks may provide more accurate scene recognition and human parsing results compared to the KINet, their improvement on main task, action recognition, is less than that of KINet (1.9%).

Further, the inventors compared a 2D KINet with conventional methods for action recognition, including 2D and 3D methods, on action recognition benchmark Kinetics-400. The inventors also include two-stream CNNs for KINet, where the RGB stream CNN is the KINet and the optical flow stream CNN is a normal (e.g., conventional) TSN structure. As shown in Table 5, the inventor's method achieves state-of-the-art results on Kinetics. Although the inventor network is based on 2D backbones, the performance is even on par with state-of-the-art 3D CNN methods.

The inventors further transfer the learned representation on Kinetics to a smaller dataset UCF-101 to check the generalization ability of their framework. Following standard TSN protocol, the inventors report the average of three train/test splits in Table 6. The results show that the inventor framework pre-trained on Kinetics has strong transfer learning ability. The inventor's model also obtains state-of-the-art results on UCF-101.

What is claimed is:

1. A computer-implemented method for action recognition, comprising:
   processing video data by one or more auxiliary branches of a network;
   identifying, by the one or more auxiliary branches, intermediate auxiliary features corresponding to the video data;
   integrating intermediate action features from an action branch and the intermediate auxiliary features from the one or more auxiliary branches of the network;
   generating, based on the integrated intermediate action features and intermediate auxiliary features, a set of high-level action features by the action branch;
   integrating high-level auxiliary features from the one or more auxiliary branches and the high-level action features from the action branch; and
   classifying an action based on the integrated high-level auxiliary features and the high-level action features.

2. The computer-implemented method of claim 1, wherein the one or more auxiliary branches are selected from the group consisting of a human parsing branch and a scene recognition branch.

3. The computer-implemented method of claim 1, further comprising:
   parsing a subject identified in the video data;
   providing, by a teacher network, a pseudo ground truth of the subject; and
   comparing an output from the one or more auxiliary branches to the pseudo ground truth.

4. The computer implemented method of claim 1, further comprising:
   determining the action is a reportable action; and
   based on the determined reportable action, providing an indicator of the action to a user.

5. The computer implemented method of claim 4, wherein the indicator includes a portion of video data corresponding to the determined reportable action.

6. The computer implemented method of claim 1, further comprising tracking an object of interest in a scene of a retail environment;
   determining a subject identified in the video data has performed a reportable action associated with a shrinkage event with the object of interest; and
   providing an indicator to a user of the reportable action.

7. The computer-implemented method of claim 1, wherein the intermediate action features correspond to determined movements in the video data and are associated with one or more shrinkage events.

8. A system comprising:
   one or more processors;
   one or more memory devices storing instructions thereon, that when executed by the one or more processors, cause the one or more processors to execute operations comprising:
   processing video data, by one or more auxiliary branches of a network, wherein the video data includes images of a scene in a retail environment;
   identifying, by the one or more auxiliary branches, intermediate auxiliary features corresponding to the video data, wherein the intermediate auxiliary features include subject features corresponding to a subject in the scene of the retail environment and scene features corresponding to the scene of the retail environment;
   integrating intermediate action features corresponding to subject movements from an action branch and the intermediate auxiliary features from the one or more auxiliary branches of the network;
   generating, based on the integrated intermediate action features and intermediate auxiliary features, a set of high-level action features corresponding to the subject movements by the action branch;
   integrating high-level auxiliary features from the one or more auxiliary branches and the high-level action features from the action branch;
   classifying a reportable action based on the integrated high-level auxiliary features and the high-level action features, wherein the reportable action is associated with an inventory shrinkage event;
   based on the classified reportable action, determining the subject identified in the video data has performed the reportable action; and providing an indicator to a user, wherein the indicator includes information relating to the inventory shrinkage event.

9. The system of claim 8, wherein the one or more auxiliary branches are selected from the group consisting of a human parsing branch and a scene recognition branch.

10. The system of claim 8, further comprising:
parsing the subject identified in the video data from one or more segments of a data stream;
providing, by a teacher network, a pseudo ground truth of the subject; and
comparing an output from the one or more auxiliary branches to the pseudo ground truth.

11. The system of claim 8, further comprising:
based on the determined reportable action, generating a report of the reportable action, wherein the report includes data corresponding to the reportable action.

12. The system of claim 8, wherein the indicator is provided to the subject corresponding to the determined reportable action.

13. The system of claim 8, further comprising:
tracking an object of interest in the scene of the retail environment;
determining the subject identified in the video data has performed the reportable action with the object of interest; and
providing the indicator to the user of the reportable action, wherein the indicator includes image data corresponding to the object of interest.

14. The system of claim 8, wherein the shrinkage event is a theft.

15. One or more non-transitory computer storage media having computer-executable instructions embodied thereon that, when executed, by one or more processors, cause the one or more processors to perform a method for implementing action recognition systems, the method comprising:
processing video data, by one or more auxiliary branches of a network;
identifying, by the one or more auxiliary branches, intermediate auxiliary features corresponding to the video data;
integrating intermediate action features from an action branch and the intermediate auxiliary features from the one or more auxiliary branches of the network;
generating, based on the integrated intermediate action features and intermediate auxiliary features, a set of high-level action features by the action branch;
integrating high-level auxiliary features from the one or more auxiliary branches and the high-level action features from the action branch; and
classifying an action based on the integrated high-level auxiliary features and the high-level action features.

16. The non-transitory media of claim 15, wherein the one or more auxiliary branches are selected from the group consisting of a human parsing branch and a scene recognition branch.

17. The non-transitory media of claim 15, further comprising:
parsing a subject identified in the video data;
providing, by a teacher network, a pseudo ground truth of the subject; and
comparing an output from the one or more auxiliary branches to the pseudo ground truth.

18. The non-transitory media of claim 15, further comprising:
determining the action is a reportable action; and
based on the determined reportable action, providing an indicator of the action to a user.

19. The non-transitory media of claim 18, wherein the indicator includes a portion of video data corresponding to the determined reportable action.

20. The non-transitory media of claim 1, further comprising tracking an object of interest in a scene;
determining a subject identified in the video data has performed a reportable action with the object of interest; and
providing an indicator to a user of the reportable action.

* * * * *